US010059332B2

(12) United States Patent
Blott et al.

(10) Patent No.: US 10,059,332 B2
(45) Date of Patent: Aug. 28, 2018

(54) CONTROLLING A MOTOR VEHICLE

(71) Applicant: Robert Bosch GmbH, Stuttgart (DE)

(72) Inventors: Gregor Blott, Salzgitter (DE); Jan Rexilius, Hannover (DE); Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 19 days.

(21) Appl. No.: 15/355,538

(22) Filed: Nov. 18, 2016

(65) Prior Publication Data
US 2017/0144655 A1 May 25, 2017

(30) Foreign Application Priority Data

Nov. 20, 2015 (DE) .................. 10 2015 222 934

(51) Int. Cl.
B60W 30/06 (2006.01)
G05D 1/02 (2006.01)
G08G 1/16 (2006.01)
G05D 1/00 (2006.01)

(52) U.S. Cl.
CPC .......... *B60W 30/06* (2013.01); *G05D 1/0088* (2013.01); *G05D 1/0219* (2013.01); *G05D 1/0246* (2013.01); *G05D 1/0255* (2013.01); *G05D 1/0257* (2013.01); *G08G 1/168* (2013.01); *G05D 2201/0213* (2013.01)

(58) Field of Classification Search
CPC .......... B60W 30/06; G05D 2201/0213; G05D 1/0088; G05D 1/0219; G05D 1/0246; G05D 1/0255; G05D 1/0257; G08G 1/168

USPC ............................................................ 701/23
See application file for complete search history.

(56) References Cited

U.S. PATENT DOCUMENTS

| 7,103,460 | B1 * | 9/2006 | Breed ................. B60C 23/0408 701/29.1 |
| 8,599,043 | B2 * | 12/2013 | Kadowaki ............ B62D 15/027 180/199 |
| 9,545,930 | B2 * | 1/2017 | Ricci .................. G01C 21/3484 |
| 2007/0182528 | A1 * | 8/2007 | Breed .................... B60Q 9/008 340/435 |
| 2009/0167564 | A1 * | 7/2009 | Long-Tai ........... B62D 15/0285 340/932.2 |
| 2013/0231824 | A1 | 5/2013 | Wilson et al. |
| 2013/0144520 | A1 * | 6/2013 | Ricci ....................... H04W 4/90 701/301 |
| 2014/0225722 | A1 * | 8/2014 | Takahashi ............. G08G 1/168 340/435 |
| 2014/0324310 | A1 * | 10/2014 | Kobayashi ......... B62D 15/0285 701/70 |
| 2016/0001781 | A1 * | 1/2016 | Fung .................... B60W 40/08 701/36 |

(Continued)

FOREIGN PATENT DOCUMENTS

DE 102011010242 A1 8/2011

*Primary Examiner* — Atul Trivedi
(74) *Attorney, Agent, or Firm* — Norton Rose Fulbright US LLP; Gerard Messina

(57) ABSTRACT

A method for controlling a motor vehicle includes steps of scanning an environment of the motor vehicle, controlling the motor vehicle as a function of the scanned information, ascertaining a driving situation of the motor vehicle, and of activating, deactivating or parameterizing a protective function of the motor vehicle as a function of the ascertained driving situation.

11 Claims, 3 Drawing Sheets

(56) References Cited

U.S. PATENT DOCUMENTS

| | | | |
|---|---|---|---|
| 2016/0082848 A1* | 3/2016 | Ichikawa | B60L 11/123 |
| | | | 701/22 |
| 2016/0089987 A1* | 3/2016 | Ichikawa | B60L 11/182 |
| | | | 701/22 |
| 2016/0371983 A1* | 12/2016 | Ronning | G08G 1/168 |
| 2018/0001930 A1* | 1/2018 | Sham | G01S 17/023 |

* cited by examiner

CONTROLLING A MOTOR VEHICLE

BACKGROUND INFORMATION

A parking system includes a parking facility having a plurality of parking spaces for parking motor vehicles; in this parking system, a motor vehicle is able to be controlled autonomously on a route between a hand-over point and one of the parking spaces in the parking facility. Such a process is known as "automated valet parking" (AVP). If a motor vehicle is to be parked in the parking facility, then it is sufficient if the driver brings the motor vehicle to the hand-over point and leaves it there. The motor vehicle then drives in a highly automated or fully automated manner to one of the parking spaces assigned to it by an administration system, for instance. If the motor vehicle is to be picked up again, then it is controllable in the reverse direction from the parking space to the hand-over point, where the driver gets in and controls the motor vehicle on his own in the conventional manner outside the parking facility.

In order to achieve short braking distances, the motor vehicle is commonly controlled at a low speed, for instance a speed of less than 10 km/h. Nevertheless, the autonomous control of the motor vehicle in the parking facility is technically complex, and there is always the risk of an accident, also possibly involving a person who is moving in the region of the parking facility.

SUMMARY

Therefore, it is an object of the present invention to provide an improved technology for controlling the motor vehicle.

A method for controlling a motor vehicle includes steps of scanning an environment of the motor vehicle, controlling the motor vehicle as a function of the scanned information, ascertaining a driving situation of the motor vehicle, and activating, deactivating or parameterizing a protective function of the motor vehicle as a function of the ascertained driving situation.

One or more different protective function(s) of the motor vehicle may advantageously be used in an improved manner for maintaining the safety of the motor vehicle or of a person in the area of the motor vehicle as a function of the ascertained driving situation. A protective function that is not required may be switched off, thereby making it possible to suppress misleading information.

In addition, the loading of a processing device is reduced in this way. Another protective function may be activated if the driving situation allows for this protective function. The protective function may also be parameterized as a function of the ascertained driving situation in order to anticipate difficulties specifically to be expected and to respond to them in an improved manner, if necessary.

The motor vehicle is preferably controlled within the framework of an automated parking operation in a parking facility between a hand-over point and a parking space for the motor vehicle. The route between the hand-over point and the parking space may be traversed in any direction. In addition, a start of driving or stopping, parking or leaving a parking space may be included in the route. A corresponding AVP operation in the parking facility is better controllable than driving on public roads, for instance. In addition, the parking facility may be set up especially to suit the AVP requirements, for instance by appropriate lighting, choice of curve radii, providing an infrastructure, etc.

In one variant, the driving situation is ascertained on the basis of information from an on-board sensor of the motor vehicle. Different sensors, which are installed on the motor vehicle, may be used for this purpose, such as a radar sensor, an ultrasonic sensor, or an optical sensor. The information is always related to the environment of the motor vehicle and may be available directly.

In another variant, the driving situation is ascertained on the basis of information from sensors of a parking-facility-side processing system. These sensors may be permanently installed in the area of the parking facility. For instance, regions that are not directly visible on the part of the motor vehicle are able to be monitored in this context.

In a third variant, sensor information of the two latter variants may be merged with each other. The merging may include a mutual verification, checking or improving an ascertained result.

In different variants, the ascertaining of the driving situation is alternatively carried out by the parking-lot-side processing system and is then transmitted to the motor vehicle, or it is carried out on board the motor vehicle with the aid of an assigned processing device, for example. A dual ascertainment may be carried out as well, the two ascertainments supplementing or validating each other. This makes it possible to determine the driving situation in an efficient and reliable manner.

If is preferred that the driving situation includes one of: starting to drive, straight-ahead driving, cornering, parking, leaving a parking space, driving on a straight ramp, driving on a ramp featuring a curve, turning around and stopping. Alternative or additional driving situation may be prepared as well. The possible driving situations may also be based on the local circumstances of the parking facility.

In one especially preferred specific embodiment, the driving situation is dynamically ascertained as a function of the presence of a temporary obstacle. The temporary obstacle may include, for instance, a climatic effect such as moisture or ice on the road, or a person or an animal in the area of the parking facility. For example, the same area of the parking facility may be evaluated as different driving situations depending on whether or not a pedestrian is present there. In another specific embodiment, the temporary obstacle may also include another motor vehicle.

In one specific embodiment, the protective function influences the control of the linear or lateral acceleration of the motor vehicle. In particular, the control of the motor vehicle may be overruled or rescinded as a function of the scanned information for reaching the destination. Elements of the chassis of the motor vehicle may furthermore be influenced by the protective function, for instance in that damping is switched between soft and hard. In a still further specific embodiment, the protective function includes the outputting of a signal in the area of the motor vehicle. An optical or acoustic signal, in particular, is able to be output in the process.

A computer program product includes program code means for carrying out the described method when the computer program product is running on a processing device or is stored on a computer-readable data carrier.

A device for controlling a motor vehicle includes a sensor for scanning an environment of the motor vehicle and a processing device which is designed to control the motor vehicle as a function of the scanned information. Furthermore, the processing device is designed to ascertain a driving situation of the motor vehicle and to activate, deactivate or parameterize a protective function as a function of the ascertained driving situation.

DETAILED DESCRIPTION

Figure 1:
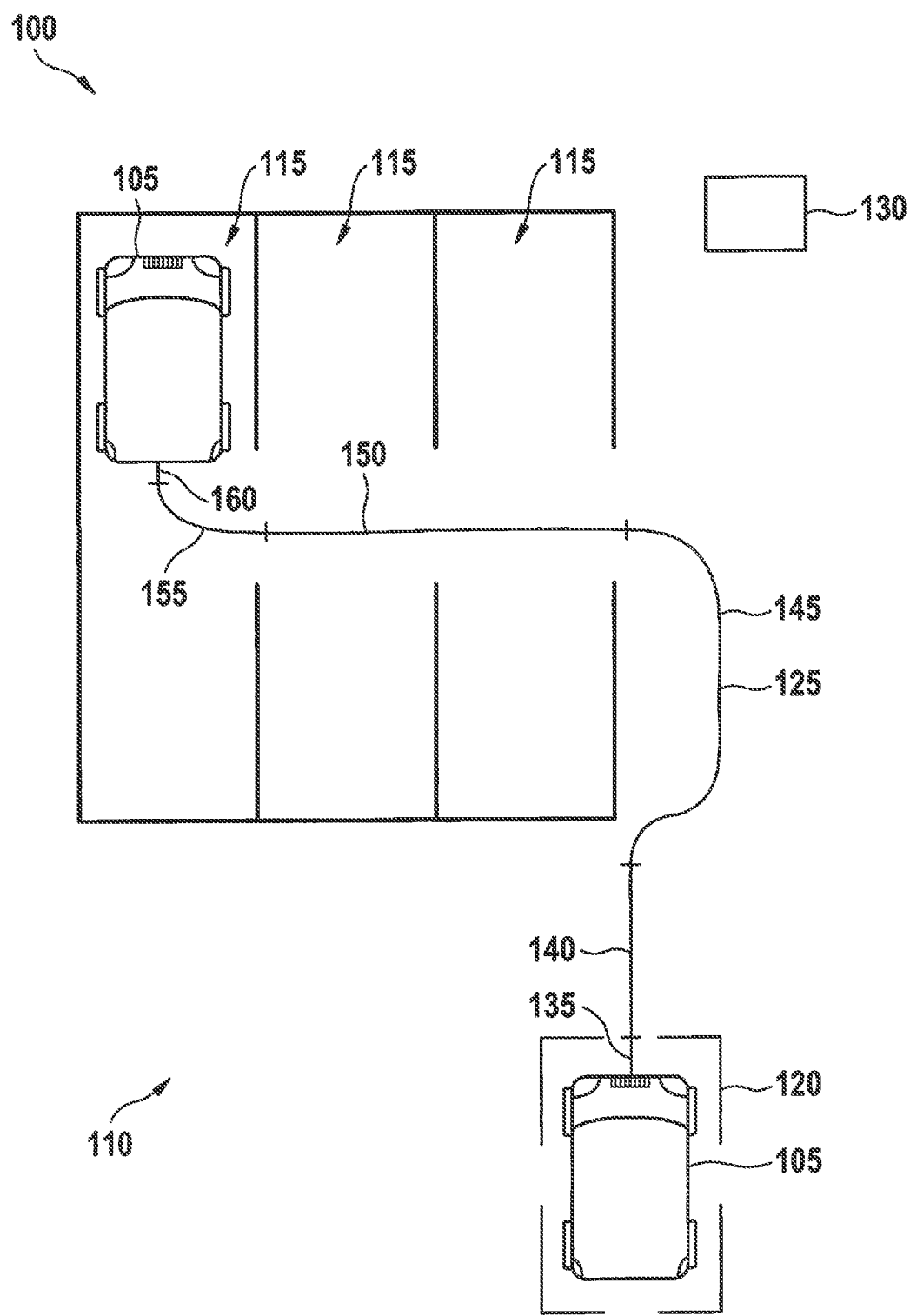
FIG. 1 shows a system with a parking facility for parking a motor vehicle.

FIG. 1 shows a system 100 which includes a motor vehicle 105 and a parking facility 110. The parking facility may be realized in different embodiments in the open or as a parking garage. Parking facility 110 includes at least one parking space 115, but usually a plurality of parking spaces 115, in which a motor vehicle 105 may be parked in each case.

Parking facility 110 is set up for automated valet parking. For this purpose, a driver may drive a motor vehicle 105 to a hand-over point 120 and leave it there. Motor vehicle 105 will then be driven along a route 125 to a predefined parking space 115 and parked there. If the driver wishes to use motor vehicle 105 again, then motor vehicle 105 is driven in a corresponding manner from parking space 115 back to hand-over point 120. The driving of route 125 takes place autonomously; neither permanent monitoring by a person is provided nor is a person usually available to take over motor vehicle 105 in the event that the automated system fails. The control of motor vehicle 105 on route 125 is able to be realized by motor vehicle 105 itself, by an infrastructure 130 of parking facility 110 or in cooperation between both systems.

Route 125 is subdivided into six sections 135 through 160 by way of example. Each section 135 through 160 represents an exemplary driving situation that may influence the control of motor vehicle 105 along route 125, but, in particular, may influence the method of functioning of a protective function of the motor vehicle. In first section 135, the driving situation corresponds to the start of driving, in second section 140, to straight-ahead driving, in third section 145, to cornering, in fourth section 150, to straight-ahead driving again, in fifth section 155, to parking, and in sixth section 160, it corresponds to stopping or parking of motor vehicle 105. Other or additional driving situations may be provided as well. In particular, it is preferred to define the driving situation not only on the basis of a driving maneuver of motor vehicle 105 but additionally on the basis of an environment, or a dynamic influence, e.g., a person in the area of the respective section of route 125. The ascertaining of the driving situation may thus be a dynamic and also complex process.

It is proposed to ascertain the driving situation of motor vehicle 105 and to activate, deactivate or parameterize a protective function of motor vehicle 105 as a function of the ascertained driving situation.

Figure 2:
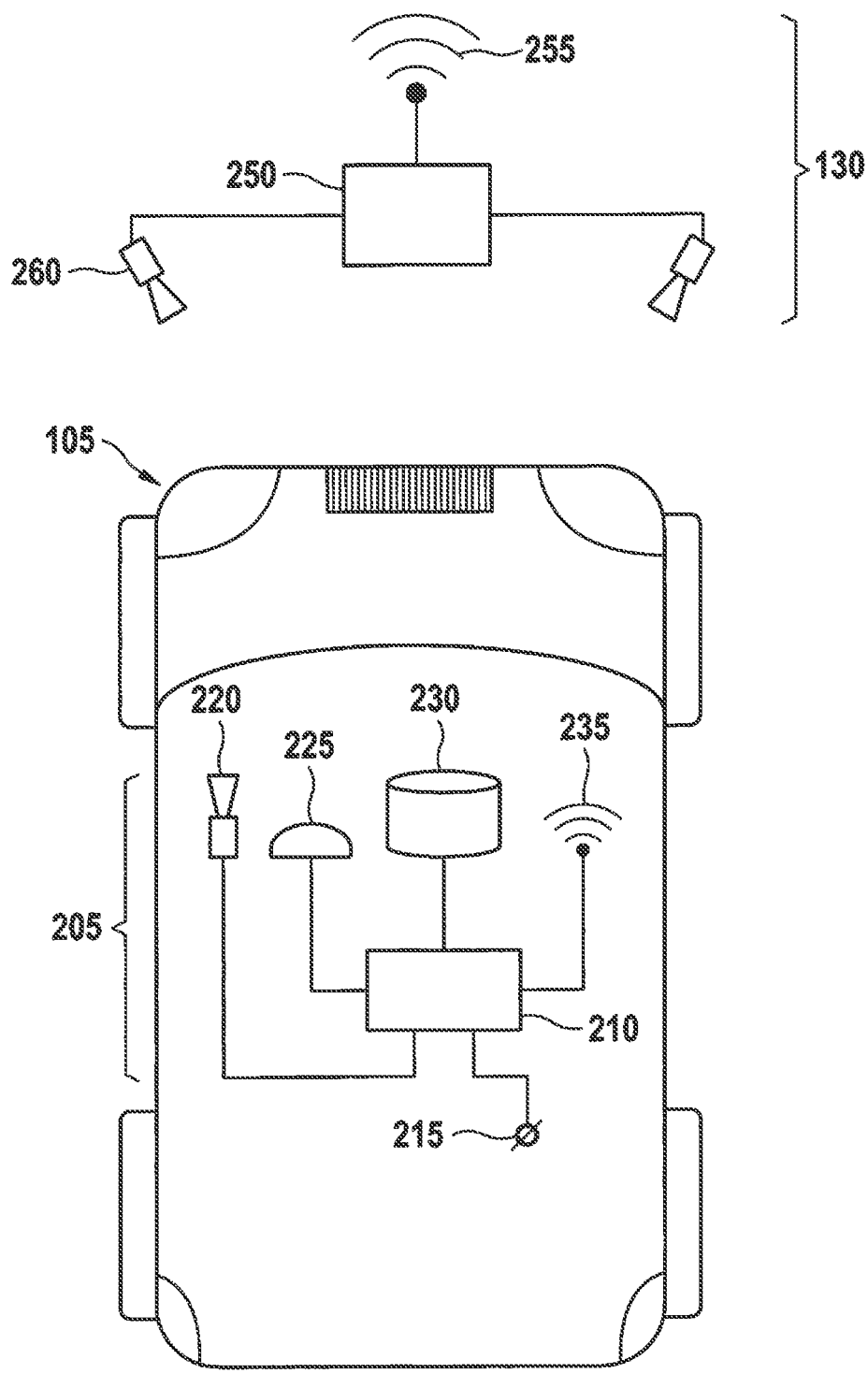
FIG. 2 shows a motor vehicle for the system from FIG. 1.

FIG. 2 shows motor vehicle 105 for parking facility 110 from FIG. 1. A device 205, which encompasses a processing unit 210 and an interface 215 for the connection to a control device of motor vehicle 105, is provided on board motor vehicle 105. Information based on which a linear or lateral control of motor vehicle 105 may be implemented can be exchanged via interface 215.

A protective function of motor vehicle 105, e.g., an active safety system such as a brake system or a passenger-restraining system, in particular, is able to be activated, deactivated or parameterized via interface 215. The protective function may also pertain to what is referred to as an assistant, such as a distance assistant or a lane-keeping assistant.

One or more sensor(s) 220 may optionally be provided for scanning an environment of motor vehicle 105. For example, a sensor 220 may include an ultrasonic sensor, a radar or lidar sensor, a camera or a stereo camera.

In addition, a positioning device 225 for ascertaining a position of motor vehicle 105 in parking facility 110 may be connected to processing device 210. An optional map memory 230 includes topological information in an environment around the position of motor vehicle 105. Furthermore, a communications device 235 for the wireless communication with infrastructure 130 of parking facility 110 is preferably provided.

Infrastructure 130 includes a processing device 250 and a communications device 255 which is designed to exchange information with communications device 235 of device 205 installed in motor vehicle 105. In addition, infrastructure 130 encompasses one or preferably a plurality of sensor(s) 260 for scanning an environment of motor vehicle 105. The scanned areas preferably lie in parking facility 110 and can also include such sections through which motor vehicle 105 is not meant to be driven. Sensors 260, for instance, may include a camera, a video camera, a motion sensor, a light barrier, a radar or lidar sensor, or an induction loop.

As will still be described in greater detail later in the text with reference to FIG. 3, it is proposed to determine a protective function on board motor vehicle 105 as a function of a driving situation of motor vehicle 105. The driving situation may define a current or an imminent driving situation of motor vehicle 105 (see sections 135 through 160 in FIG. 1).

In a first example, it is known that motor vehicle 105 will drive on an inclined plane, in particular a parking garage ramp of parking facility 110, in a predefined driving direction (uphill or downhill). The protective function may pertain to a brake system of motor vehicle 105, and the protective function is able to be parameterized in that an additional brake pressure is built up in anticipation of a downgrade force acting on motor vehicle 105. If an on-board system for the linear control of motor vehicle 105 should fail, then motor vehicle 105 is able to be decelerated rapidly and safely nevertheless.

In another example, the motor vehicle may be transferred into a special mode in which the correct functioning of a protective function and/or a control function of motor vehicle 105 is checked before the ascertained driving situation occurs. In different specific embodiments, the function can be checked in a normal, more intensive or a complete manner. For example, a voltage, a load current or a brake pressure may be analyzed more frequently and/or or more intensively in order to detect a failure of the protective function—in this case, the brake system—early on. In the event that the protective function does indeed fail, then countermeasures may be taken or a different protective function can be activated instead, such as a parking brake.

The parking facility management system or infrastructure 130 may also inform motor vehicle 105 which particular protective measure it is to initiate. One or more protective function(s) may be affected.

In a still further example, the protective function may also be provided outside of the motor vehicle, by parking facility 110. For this purpose, infrastructure 130 may have a threshold that can be lowered, for example, or a barrier which could be used to block motor vehicle 105. The barrier, for instance, may induce an on-board system to avoid an impact, whereby the motor vehicle is stopped at the barrier. An extendable barrier or a similar device may also physically keep motor vehicle 105 from entering a predefined area. Damage to motor vehicle 105 may be tolerated in this context.

In a still further example, the protective function may relate to a waiting function. Travel on said ramp, for example, may be allowed only when a space at the end of the ramp is free. In a further specific embodiment, there may also be a wait until the space will be unoccupied within a predefined existing time span. If this should not be the case, driving can be delayed until said condition has been satisfied.

In one further example, motor vehicle 105 may drive on a parking garage spiral ramp that essentially includes a curve-shaped ramp having a predefined gradient. If motor vehicle 105 is driving on the spiral ramp of the parking garage, then attention must be paid not only to the uphill or downhill gradient, but it must also be taken into account that a forward-directed view of an on-board sensor 220 may be restricted considerably. Here, too, the brake pressure may be increased as a protective measure. In a further specific embodiment, additional information may be transmitted to motor vehicle 105 in order to prevent a rear-end collision with a standing motor vehicle 105 on the spiral ramp of the parking garage, for instance. Encompassed by the protective function may also be that the travel speed of motor vehicle 105 is reduced or that a motor vehicle 105 is prevented from driving on the spiral ramp of the parking garage until the parking garage spiral ramp is unoccupied.

In a still further example, motor vehicle 105 is meant to pass through an area of parking facility 110 traversed by a pedestrian crossing. Depending on whether people are present in the pedestrian crossing, the motor vehicle may be guided across the pedestrian crossing at different speeds. This speed adaptation may also be implemented outside the area of the pedestrian crossing. On the whole, travel by the motor vehicle along route 125 is faster as a result, so that a total throughput of parking facility 110 may be increased.

Figure 3:
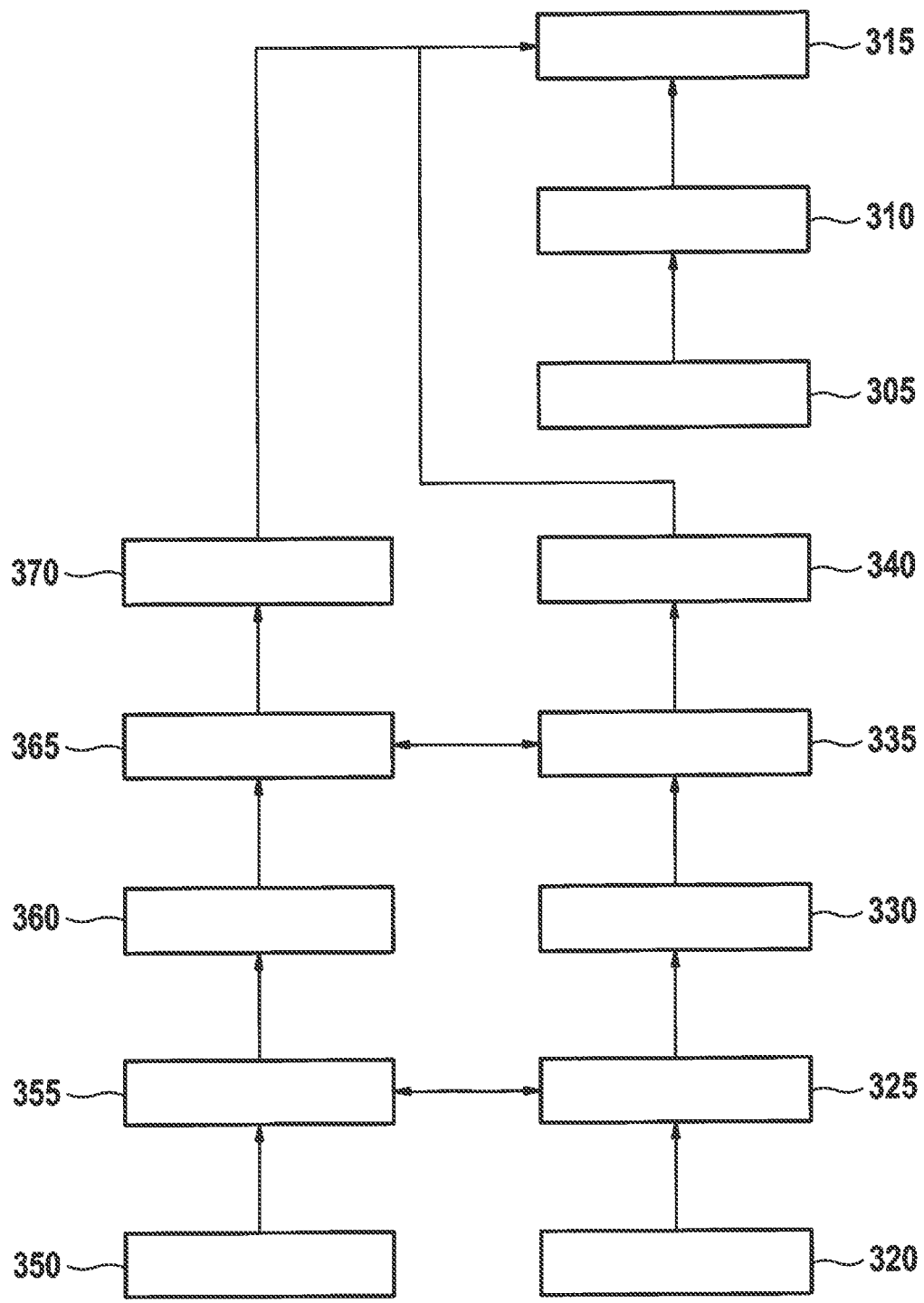
FIG. 3 shows a flow diagram of a method for controlling the motor vehicle from FIG. 2 in the parking facility of FIG. 1.

FIG. 3 shows a flow chart of a method 300 for controlling motor vehicle 105 of FIG. 2 in parking facility 110 of FIG. 1. In a step 305, the environment of motor vehicle 105 is scanned. In a subsequent step 310, the scanned information is processed. The processed information is normally utilized for controlling motor vehicle 105 along route 125. In particular an autonomous, i.e. fully-automated, control of motor vehicle 105 is endeavored in this context. Provided in parallel with the control of motor vehicle 105 or in competition therewith, is a protective function which is able to influence the control of motor vehicle 105 in a step 315. It is possible, in particular, to trigger the protective function on the basis of the processed information from step 310.

It is proposed to activate, deactivate or parameterize the protective function in step 315 as a function of a previously ascertained driving situation.

Different specific embodiments are outlined in FIG. 3 for this purpose. For better clarity, steps shown in a right area of FIG. 3 are allocated to motor vehicle 105 or device 205, and steps shown on the left are allocated to parking facility 110 or its infrastructure 130.

In a first specific embodiment, the environment of motor vehicle 105 is scanned with the aid of on-board sensor 220 in a step 320. This step may also be executed in integrated fashion with step 305. Optionally, the scanned sensor information may be transmitted to infrastructure 130 of parking facility 110 in a step 325.

In a subsequent step 330, the scanned information is processed. The processed information may optionally be transmitted to infrastructure 130 of parking facility 110 in a step 335. In a step 340, the driving state is then able to be ascertained with the aid of processing device 210 of device 205 on board motor vehicle 105.

In a second specific embodiment, steps 350 through 370, which correspond to steps 320 through 340, are carried out by infrastructure 130. In a step 350, the environment of motor vehicle 105 is scanned, in a step 355, the scanned information is optionally transmitted to motor vehicle 105, in a step 360, the information is processed, optionally transmitted to motor vehicle 105 in a step 365, and the driving state is finally ascertained in a step 370.

The two exemplary embodiments may be executed in parallel, so that two ascertained driving situations are at hand for the protective function in step 315. However, it is preferred that only one driving situation is ascertained, in particular alternatively in step 340 or in step 370. A corresponding exchange of unprocessed or processed information between infrastructure 130 and device 205 may take place for this purpose.

What is claimed is:

1. A method for controlling a motor vehicle, the method comprising:
scanning, vi a sensor arrangement, an environment of the motor vehicle;
controlling, via a processor, the motor vehicle as a function of the scanned information;
ascertaining, via the processor, a driving situation of the motor vehicle;
one of activating, deactivating, and parameterizing, via the processor, a protective function of the motor vehicle as a function of the ascertained driving situation;
determining whether there is a failure of a protective function of the motor vehicle before the ascertained driving situation occurs; and
performing, if there is a failure of the protective function, a countermeasure or activating a different protective function.

2. The method as recited in claim 1, wherein the motor vehicle is controlled within a framework of an automated parking operation in a parking facility between a hand-over point and a parking space for the motor vehicle.

3. The method as recited in claim 2, wherein the driving situation is ascertained on the basis of information from an on-board sensor of the motor vehicle.

4. The method as recited in claim 2, wherein the driving situation is ascertained on the basis of information from sensors of a parking-facility-side processing system.

5. The method as recited in claim 2, wherein the driving situation is ascertained by a parking-facility-side processing system and transmitted to the motor vehicle.

6. The method as recited in claim 2, wherein the driving situation is ascertained with the aid of a processing device on-board the motor vehicle.

7. The method as recited in claim 1, wherein the driving situation includes one of:
starting to drive,
straight-ahead driving,
cornering,
parking,
leaving a parking space,
driving on a straight ramp,
driving on a ramp featuring a curve,
turning, and
stopping.

8. The method as recited in claim 1, wherein the driving situation is ascertained dynamically as a function of a presence of a temporary obstacle.

9. The method as recited in claim 1, wherein the protective function influences a control of one of a linear acceleration of the motor vehicle and a lateral acceleration of the motor vehicle.

10. A non-transitory computer readable medium having a computer program, which is executable by a processor, comprising:
   a computer code arrangement having program code for controlling a motor vehicle, by performing the following:
      scanning, via a sensor arrangement, an environment of the motor vehicle;
      controlling, via the processor, the motor vehicle as a function of the scanned information;
      ascertaining, via the processor, a driving situation of the motor vehicle;
      one of activating, deactivating, and parameterizing, via the processor, a protective function of the motor vehicle as a function of the ascertained driving situation, the method being executed when the computer program product is running on a processing device or is stored on a computer-readable data carrier;
      determining whether there is a failure of a protective function of the motor vehicle before the ascertained driving situation occurs; and
      performing, if there is a failure of the protective function, a countermeasure or activating a different protective function.

11. A device for controlling a motor vehicle, comprising:
   a sensor arrangement for scanning an environment of the motor vehicle to produce scanned information; and
   a processing device for controlling the motor vehicle as a function of the scanned information, wherein the processing device is configured to ascertain a driving situation of the motor vehicle and to one of activate, deactivate, and parameterize a protective function as a function of the ascertained driving situation;
   wherein the processing device is configured to determine whether there is a failure of a protective function of the motor vehicle before the ascertained driving situation occurs; and to perform, if there is a failure of the protective function, a countermeasure or activating a different protective function.

* * * * *